United States Patent [19]
Nitta et al.

[11] 3,742,246
[45] June 26, 1973

[54] CONTROL DEVICE FOR A CIRCUIT BREAKER

[75] Inventors: Yoshio Nitta; Nobuaki Kiyokuni; Kikuo Kawasaki, all of Kawasaki, Japan

[73] Assignee: Fuji Denki Seizo Kabushiki Kaisha, Kawasaki-shi, Kanagawa-ken, Japan

[22] Filed: Nov. 15, 1971

[21] Appl. No.: 198,795

[52] U.S. Cl................................. 307/143, 317/151
[51] Int. Cl. ........................................... H01h 47/00
[58] Field of Search........................... 307/143, 109; 317/31, 33 SC, 27 R, 151; 320/1

[56] References Cited
UNITED STATES PATENTS
3,213,321 10/1965 Dalziel............................ 317/151 X
3,312,875 4/1967 Mayer.............................. 317/151 X Primary Examiner—Robert K. Schaefer
Assistant Examiner—William J. Smith
Attorney—Holman & Stern

[57] ABSTRACT

Described herein is a control device for a circuit breaker, which is so arranged that an electric power is supplied to a high potential side through an insulating transformer thereby to charge a capacitor, said capacitor being discharged by an operating signal thereby to start a switching operation at a great rate; in which a current limit device is provided on the ground side of the said insulating transformer as a result of which the insulating transformer can be made smaller, a switching operation can be achieved even in the re-charging period of the capacitor, and a recharging time of the capacitor is made shorter, and furthermore a pressure or stress wave propagating in an insulation bar is utilized so as to accurately transfer an operating signal issued from the ground side to a discharge gap placed on the high potential side without time delay.

7 Claims, 7 Drawing Figures

3,742,246

CONTROL DEVICE FOR A CIRCUIT BREAKER

BACKGROUND OF THE INVENTION

The present invention relates to a control device for a circuit breaker used in power transmission system.

As well known, troubles with respect to a transmission line of an extra-high voltage system results in damages much more serious than those involved in troubles of a lower-voltage system. Therefore, a plan should be made so that causes for those troubles be removed as soon as possible thereby to quickly restore the power transmission ability. Accordingly, required for such system mentioned above is a circuit breaker that can accomplish a high speed breaking operation and has the function of a high speed reclosing operation.

For this purpose, a device has been disclosed, in which electro-static energy stored in a capacitor is used for driving a movable contact of a high-voltage circuit breaker. It is also well known to supply charging energy to a capacitor on the high potential side through a cascade connected insulating transformer installed between the ground side and high potential side. Furthermore, it is publicly known a light propagating through an insulation bar is employed as an operating signal issued from the ground side.

In addition to the above, a circuit breaker meeting the above-mentioned requirement has been developed by the applicant and is now used in an actually loaded system.

The technical arrangement of this circuit breaker is described in detail in the specification of U.S. Pat. No. 3,315,056. The principle of the breaking operation revealed in the patent resides in that an electromagnetic repulsion force is produced between a movable contact and a driving coil, provided oppositely to the stationary contact, by discharging electrostatic energy of a operating capacitor into the driving coil, the thus produced repulsion force being utilized so as to instantaneously drive the movable contact apart from a stationary contact. Therefore, if this driving principle is applied to a short circuiter or a closing device, a reasonable closing operation can be obtained in the same way as breaking operation in the circuit breaker.

However, in general, the specification of the operating capacitor adapted to instantaneously drive the movable contact is required to be large in capacity and high in voltage. Therefore, in the case where the capacitor of this type is installed in a high potential casing with applied a high voltage, disadvantageously it may take a long time to re-charge the capacitor after it having been discharged. In case of such operating capacitor employed for the extra-high voltage circuit breaker mentioned previously, the capacitor should be recharged so that its voltage quickly reaches a predetermined voltage within a short time on the basis of the operational requirement such as high speed reclosing. Therefore, an operating power source device for this purpose should be a charging device having a large capacity, for instance, several kVA. However, such device involves disadvantages that it is considerably high in cost and heavy in weight. In addition, how to suppress or control a large rush current in the recharging operation and how to quickly achieve the recharging operation are the problems given to the device of this type.

SUMMARY OF THE INVENTION

A primary object of the present invention resides in the fact that a current limit device is provided on the ground side in order to suppress or control a charging rush current flowing to a capacitor of a circuit breaker, and said control device placed on a high potential side is made operative.

Another object of the present invention resides in the fact that a charging current for an operating capacitor of control device is obtained by means of a current transformer and a re-closing operation can be successfully accomplished with no trouble even in a period of a re-charging operation.

A further object of the present invention is to make a charging voltage of an operating capacitor higher than a predetermined value by a tap-changing operation only when it is charged, in order to make shorter the re-charging time of the operating capacitor.

A still further object resides in that a pressure wave signal through an insulation bar is utilized in order to accurately transfer an operating signal issued from the ground side to a discharge gap placed on a high potential side without time delay.

A particular object of the present invention is to improve the discharging characteristic of the spark gap thereby to achieve a breaking operation without serious time delay.

A more particular object of the present invention resides in that a change-over switch used for the reclosing operation is constructed as a flip-flop valve thereby to obtain an accurate change-over operation for operating capacitors to the driving coil.

Various further and more specific objects, feature and advantages of the present invention will be apparent from the description given below, taken in connection with accompanying drawings illustrated by way of example preferred embodiments of this invention.

DETAILED DESCRIPTION OF THE INVENTION

Figure 1:
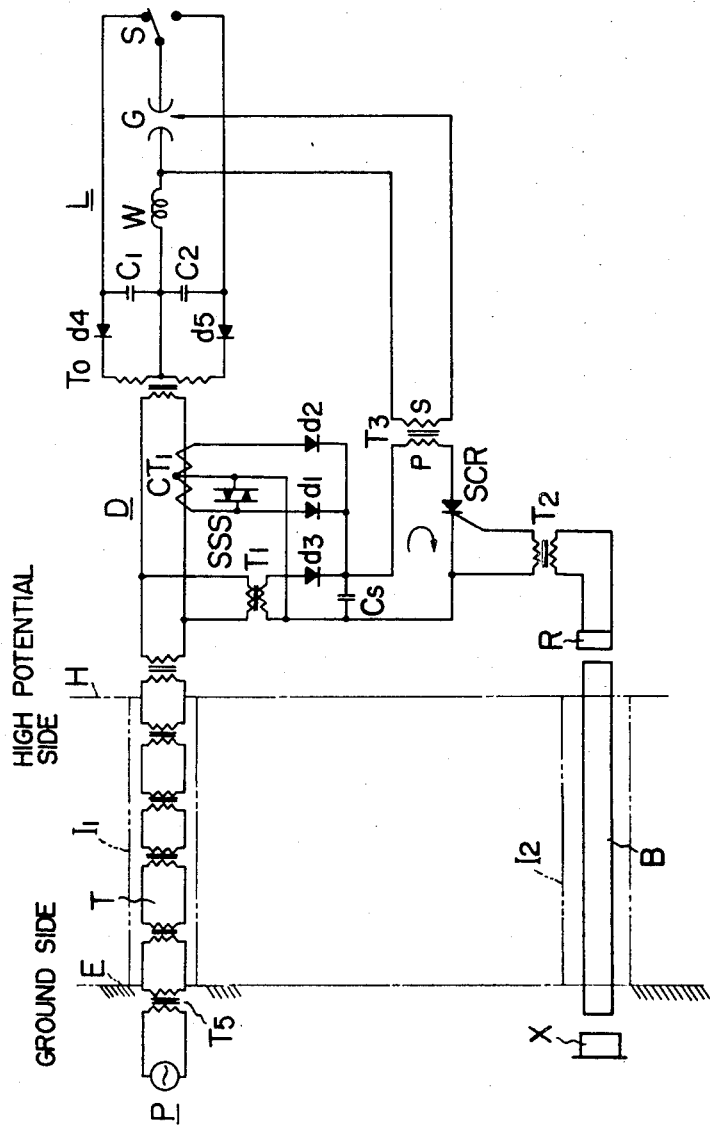
FIG. 1 is an electrical connection diagram of a control circuit illustrating an embodiment of the present invention.
Figure 2:
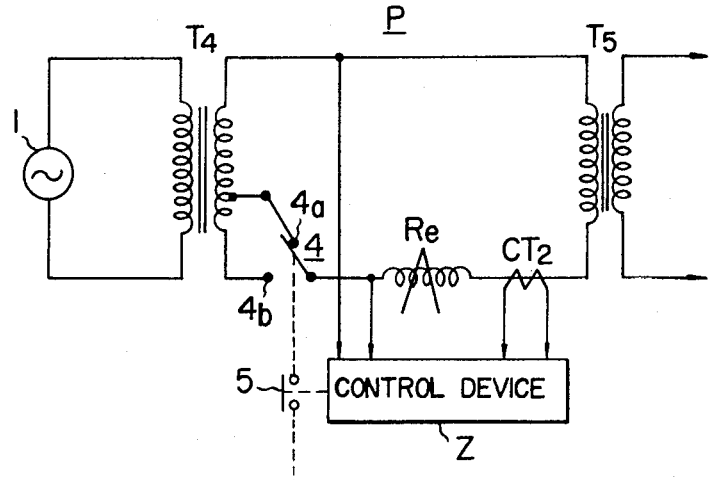
FIG. 2 is an electrical connection diagram illustrating in detail an electric source device which is a part of the electrical connection diagram shown in FIG. 1.

With reference now to FIG. 1, there is shown an electrical wiring diagram for a control circuit according to the present invention, in which a portion shown with a dot-dash line E is on the ground side while a portion shown with the other dot-dash line H is on a high potential side. An electric source device P provided on the ground side is constructed as shown in FIG. 2 and its output side is connected to the lowest stage of a cascade connection type transformer T. The cascade connection type transformer T consisting of a group of transformers is enclosed in a supporting porcelain $I_1$, and an electric power is supplied to a load L on the high potential side through the transformer T group.

An insulation bar B is housed in the other supporting porcelain $I_2$, and an impulse wave generator X is provided on one side of the insulation bar B, while a receiver means R adapted to convert an impulse wave into an electrical signal is provided on the other end of said bar. (Refer to FIG. 3)

As apparent from FIG. 1, in connection of a control device D and a capacitor load circuit L both being on the high potential side, a current transformer $CT_1$ is provided in series with the electrical source circuit, a voltage produced in the secondary winding of the current transformer $CT_1$ is full-wave-rectified through rectifiers $d_1$ and $d_2$ thereby charging a control capacitor $C_s$, and on the other hand the control capacitor Cs is charged through a transformer $T_1$ and a rectifier $d_3$. There is a bidirectional two-terminal thyristor SSS connected between one end of the winding of the current transformer $CT_1$ and its center tap, whereby, when a terminal voltage of thyristor thyristor exceeds a certain value, both terminals of the thyristor are short-circuited thereby to suppress the terminals voltage to a certain value.

On the output side of a transformer $T_o$, there are rectifiers $d_4$ an $d_5$ and operating capacitors $C_1$ and $C_2$ which are connected as shown in FIG. 1. The connected points of the rectifiers and capacitors are further connected to their respective common terminals of a change-over switch S. A series circuit of a discharge gap G and a driving coil W coupled electromagnetically to a movable contacts of an electric power circuit breaker (not shown) is connected between the center point of the switch S and the center tap of the transformer To. When a discharge is effected between the electrodes of the discharge gap G, and electric charge in the capacitor $C_1$ or $C_2$ is transferred to the driving coil W through the switch S. Then, an electromagnetic repulsion force produced between a current produced in the coil W and a current induced in a part of the movable contact makes the latter apart from its mating stationary contact.

In order to produce the discharge in the discharge gap G, a transformer $T_3$ is provided. In addition, a silicon-controlled rectifier SCR is connected in series to a primary winding of the transformer $T_3$ and then to the control capacitor Cs, and furthermore a transformer $T_2$ is connected between the gate of the rectifier SCR and one of the terminals of the capacitor Cs.

Referring to FIGS. 1 and 2 again, described hereinafter is a function of the control device according to the present invention.

Now, let's assume that the operating capacitors $C_1$ or $C_2$ have been discharged thereby completing the first breaking operation. Then, a large current will flow to the primary winding side of the transformer To, and to the current transformer $CT_1$. Since said current is supplied from the electric source device P placed on the ground side, this current is detected by a current transformer $CT_2$ inserted between transformers $T_4$ and $T_5$. As a result, a control device Z is operated, thereby to actuate a contact 5 with the result that a pole of a contact 4 is thrown over to a contact 4b from a contact 4a, whereby the capacitors $C_1$ and $C_2$ are quickly charged again by the whole output voltage of the transformer $T_4$. As the charge is advanced, a current of the current transformer $CT_2$ gradually reduces. Therefore, when a value of the current becomes lower than a predetermined value, the control device Z is restored back to its original condition thereby switching the contact 4, so that the capacitors are charged with a rated voltage at the contact 4a again.

A reactor Re connected in series with the current transformer $CT_2$ is adapted to suppress a large current flowing when the capacitors are charged. The reactor is relatively heavy in weight and large is size. Therefore, it is preferably provided on the electric source section on the ground side. In other words, A space in the interior of the casing provided on the high potential side is not so spacious, and therefore a structure such as the reactor should be provided on the ground side.

On the high potential side, the control capacitor Cs is charged through the transformer $T_1$ at all the times. However, as stated above, a voltage-drop due to impedance of the insulating transformer T is caused by a current flowing when the capacitor $C_1$ or $C_2$ being recharged, as a result of which an input voltage of the transformer $T_1$ is greatly lowered, whereby the capacitor Cs cannot be charged up to a predetermined value. However, when a charging current flows through the current transformer $CT_1$, the current is supplied to the capacitor Cs through the rectifiers $d_1$ and $d_2$, thereby to expedite charging the capacitor Cs. With completion of charging the capacitor Cs, the terminal voltage of the thyristor SSS is raised up. When this terminal voltage reaches a certain value, the thyristor SSS causes a break-down thereby to maintain the terminal voltage constant. It is desirable to employ a current transformer having a large exciting impedance for the current transformer of this circuit. An iron core such as a permalloy having a high permeability is preferably employed. Furthermore, it is desirable that a voltage produced in the secondary winding is selected so that a voltage produced therein when the thyristor SSS is not connected thereto be approximately twice as much as a break-down voltage of the thyristor SSS. The break down voltage is determined from a voltage required for the capacitor Cs.

Figure 3:
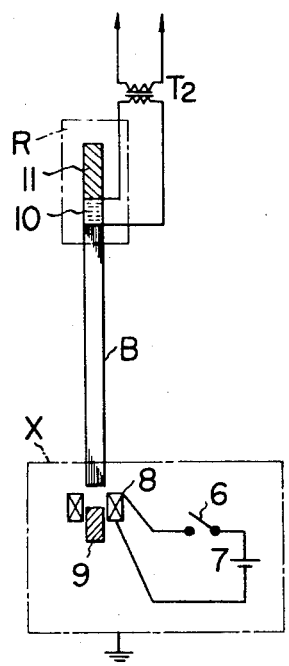
FIG. 3 is a diagram explaining an impulse generator and a receiver which are used for transferring a operating signal.

In FIG. 3, there are shown the impulse-wave generator X and the receiver R.

When a switch 6 is turned on by a operating signal, a coil 8 is excited by a current fed from an electric source 7. Then, a movable iron core 9 is attracted towards the center portion of the solenoid coil 8, and is collided with a great acceleration against the lower end of the insulation bar B. It is known that a value of a compressive stress $\sigma$ can be represent by the following formula:

$$\sigma = \sqrt{(Er/g)}U_o$$

where:
E is a longitudinal elastic modulus of a bar,
r is a weight per unitary volume, g is a gravity acceleration, and Uo is a displacement
The in
slight displacement of the insulation bar at collision. The compressive stress is propagated as a compressive wave in the insulation bar B, and the propagation rate U is as follows:

$$U = \sqrt{Er/g}$$

The propagation rates of typical insulation materials are as follows:

| Material | Propagation rate (u) m/sec |
| --- | --- |
| Glass | 5,000 |
| Resin | 1,000 to 2,000 |
| Porcelain | 5,400 |

When the wave motion (longitudinal wave) reaches the upper end of the insulation bar B, a piezo-electric element 10 is imparted with a compressive force thereby to produce a high voltage. Reference symbol 11 is a member having a proper mass, which is placed on the upper side of the piezo-electric element 10. The high voltage thus produced by the piezo-electric element 10 is fed to the transformer $T_2$. When a voltage is thus produced over the transformer $T_2$, the silicon-controlled rectifier SCR becomes conductive whereby a current of the control capacitor Cs is discharged out to a transformer $T_3$, as a result of which a discharge is caused between the electrodes of the discharge gap G, thereby to discharge the operating capacitor $C_1$ or $C_2$, as mentioned previously.

As explained above, since the longitudinal wave propagating in the insulation bar is utilized as a means of transferring the operating signal, according to the present invention, the signal can be transferred out with a smaller operating force at a quicker transferring rate of several thousands of meters/sec. when compared with a conventional case where a circuit breaker is driven by pull rod or pneumatically. Therefore, according to the present invention, it is possible to obtain a operating signal transferring rate ranked next to that in the case when light is used as a medium of transferring the operating signal.

Figures 4A, 4B:
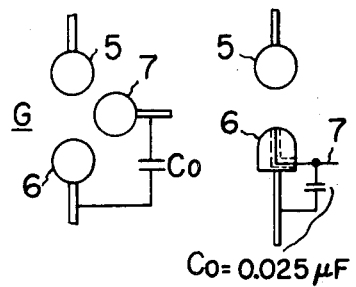
FIG. 4 exhibits discharge gap means employed in the present invention.

Referring now to FIG. 4, there is shown a construction of the discharge gap G whose essential element, namely, a capacitor is connected between a starting electrode, or a center electrode shown in FIG. 4b, and one side of main electrodes.

The discharge gap should start the discharge operation without actually delay of time and its operation is sure and stable, upon receiving of a signal. For these purposes, it is necessary to cause a great spark in the discharge gap in response to the signal.

Figure 5:
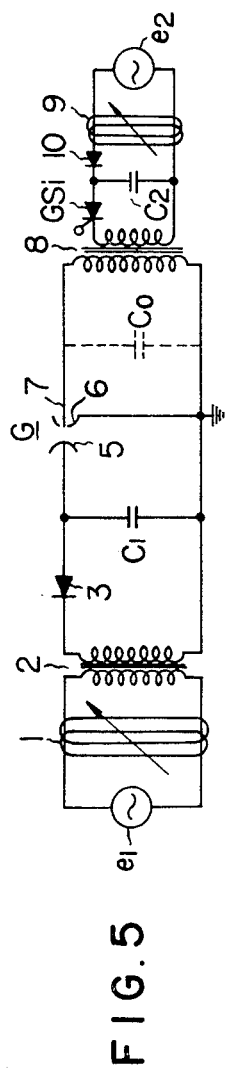
FIG. 5 is a test circuit utilized for the discharge gap means shown in FIG. 4.

FIG. 5 shows an electrical connection diagram of a test circuit for the discharge gap constructed as FIG. 4; said test circuit comprising a "slidac" 1, a transformer 2, a rectifier 3, and a discharging capacitor $C_1$ whose both terminals are connected to electrodes 5 and 6 of the discharge gap G. A starting transformer 8 is connected between a starting electrode 7 and the electrode 6; while another electric source $e_2$, a "slidac" 9, a rectifier 10, a capacitor $C_2$ and a thyristor GSi are connected to a primary side of the transformer 8.

Now, after the capacitors $C_1$ and $C_2$ have been charged up to a certain value, respectively, a gate circuit of the thyristor GSi is activated with the aid of a control device (not shown). Then, as soon as a voltage is induced in a secondary winding of the transformer 8 by discharging of the capacitor $C_2$, a discharge is effected between the starting electrode 7 and the electrode 6 and the capacitor $C_1$ is then discharged.

According to the object of the present invention, a capacitor Co shown by a dotted line is connected between the starting electrode 7 and the electrode 6.

The test results given on the discharge gap with the circuit thus constructed have shown that a magnitude of a spark arc caused between the electrodes 6 and 7 in the case when the capacitor Co is connected as mentioned above is about 10 times as great as that in the case when the capacitor Co is not connected. Accordingly, in the latter case, though the capacitor $C_2$ was discharged under conditions that a gap distance between electrodes 5 and 6 was set 4 mm and a charging voltage of the capacitor $C_1$ was 4.1 kV, no discharge was effected between the main electrodes of the discharge gap G. On the contrary it was confirmed through the tests that, in the case when the capacitor Co of 0.025 $\mu$F was connected between the electrodes 6 and 7 according to the present invention, there was a discharge effected between the electrodes of the discharge gap with the discharge of the capacitor $C_2$ by application of a voltage of 2.6 kV between the electrodes 5 and 6.

When the discharge is caused between the electrodes of the discharge gap G in response to the signal, either the capacitor $C_1$ or the capacitor $C_2$ is discharged, as described with reference to FIG. 1 (in case of FIG. 1, the capacitor $C_1$ is firstly discharged). When a movable contact (not shown) is driven by the discharge thus caused, the change-over switch changes over its contact. Therefore, when a switching signal is issued, the discharging circuit becomes ready for the discharge of the other capacitor $C_2$.

The above-mentioned change-over operation will be explained with reference to FIG. 6, in which the same parts as in FIG. 1 are designated by the same symbols of numbers.

Figure 6:
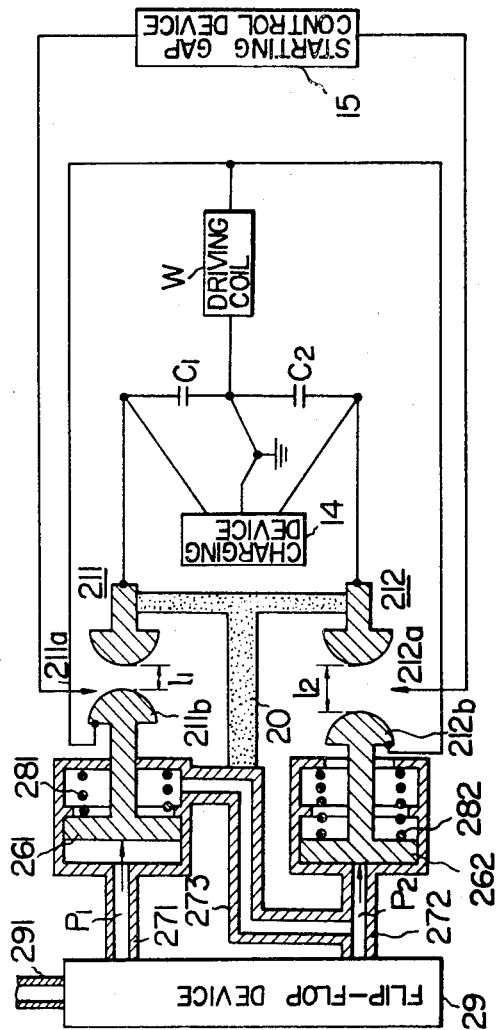
FIG. 6 is a side view of a change-over means for an operating capacitor, which is partially sectioned.

Shown in FIG. 6 is a device adapted to change-over the operating capacitors, which comprises the driving coil W acting as a load, the operating capacitors $C_1$ and $C_2$, a charging device 14 and a starting gap control device 15. In this device, a starting gap 211 is provided in series with the capacitor $C_1$ while the other starting gap 212 is provided in series with the capacitor $C_2$. One electrode of each of the starting gaps 211 and 212 is fixedly supported by an insulation member 20. The other electrodes 211b and 212b thereof are provided in the form of a unit with piston valves 261 and 262 and are movable in axial directions thereof, respectively. The piston valve 261 is driven over to its starting position, as indicated, against a pressure caused by a spring 281 when a pressure $P_1$ in a tube 271 is increased. At this time, a distance between both electrodes of the starting gap 211 is $l_1$. Similarly, the piston valve 262 is driven to its starting position from its open position shown in FIG. 6 against a pressure caused by a spring 282 when a pressure $P_2$ in a tube 272 is increased. When the piston valve 262 is at the open position as shown in FIG. 6, a distance between both electrodes of the starting gap 212 is $l_2$. Therefore, even though a starting signal is applied to a starting electrode 212a, the starting gap is not activated. A tube 273 is provided between the tube 272 and a chamber enclosing the spring 281 so that the pressure $P_2$ in the tube 272 acts in the same direction as the spring 281 with respect to the piston valve 261. The tubes 271 and 272 are connected to a well known fluid type flip-flop device 29. Whenever a fluid pressure as an input signal is applied to an input signal tube 291, the pressures $P_1$ and $P_2$ in the tubes 271 and 272 are alternatively inversed—that is, one of the pressures is increased while the other is decreased or zeroed.

Under conditions shown in FIG. 6, the pressure $P_1$ is higher than the pressure $P_2$. Furthermore, since the starting gap 211 is positioned as shown in FIG. 6, this is a state that the starting gap 211 is ready for starting the discharge at any time whenever the operating signal is issued, while the other starting gap 212 is in a state that it cannot discharge even if the signal is issued.

Now, if the starting signal is fed to the starting electrode 211a from the starting gap control device 15, the starting gap 211 is discharged, whereby the operating capacitor $C_1$ charged in advance is discharged through the coil W. Since the discharging current flows through the coil W, a means driven by the discharging current, for instance, the contacts of the circuit breaker achieves its opening operation. When the fluid signal is fed to the tube 291 in response to the opening operation of the circuit breaker, the flip-flop device 29 is operated, the pressure $P_1$ is decreased, and the pressure $P_2$ is increased. Therefore, both the pressure of the spring 281 and the pressure $P_2$ thus increased are imparted, in combination, to the piston valve 261, thereby to drive the electrode 211b to the open position apart from its mating stationary electrode. At the same time, the piston valve 262 and the electrode 212b formed integrally as one unit with the piston valve 262 are driven to the starting position from the open position show in FIG. 6 by the action of the pressure $P_2$. Under this condition, when a starting signal is applied to the starting electrode 212a from the starting gap control device 15, the starting gap 212 and the operating capacitor $C_2$ connected in series with the former 212 are now discharged.

Furthermore, when a fluid signal is issued to the tube 291 again, the pressure $P_1$ in the tube 271 becomes higher than the pressure $P_2$ in the tube 272, as a result of which the changeover device is restored back as shown in FIG. 6.

A described above, a movable provision of at least one of the electrodes of the starting gap enables the starting gap to have the function of the change-over switch shown in FIG. 1.

In the device shown in FIG. 6, when the pressure of an operating fluid is reduced, both the pressures $P_1$ and $P_2$ cannot drive the electrodes 211b and 212b, the electrodes 211b and 212b are held at their open positions by the action of the springs 281 and 282, respectively. Therefore, both the starting gaps 211 and 212 can be made inoperative regardless of the operation of the starting gap control device. For instance, in the case where a fluid pressure source is used for both the change-over device and the circuit breaker itself and therefore the fluid pressure becomes so low that it is not proper for the circuit breaker to conduct its opening operation, the discharging current supplied to the coil W is cut out thereby to avoid failures due to the operation of the circuit breaker itself.

As obvious from the above description, the circuit breaker can be properly controlled with the control device according to the present invention, in conformance with the essential objects of the circuit breaker.

It is intended that all matters contained in the foregoing description and in the drawings shall be interpreted as illustrative only not as limitative of this invention.

We claim:

1. In a control device for a circuit breaker incorporating an insulating transformer and at least one capacitor and connected so that electric power is supplied to a high potential side thereof through said insulating transformer to charge said capacitor, and wherein means are provided to discharge said capacitor by an operating signal to start a high speed switching operation of said circuit breaker, the improvement comprising a current limit means disposed on the ground side of said insulating transformer for controlling the current during recharging of said capacitor.

2. A control device as set forth in claim 1, which comprises a current transformer means for supplying a charging current to an operating capacitor, and rectifier means for rectifying the output current of said current transformer means and for expediting charging of a control capacitor by the rectified current of said rectifier means, whereby a re-closing operation is effectuated even in a recharging period of said operating capacitor.

3. A control device as set forth in claim 2, wherein means are provided for recharging said operating capacitor with a voltage higher than a predetermined voltage, the voltage of the operating capacitor being automatically restored to a normal voltage after the voltage of the operating capacitor reaches a predetermined charging voltage.

4. A control device as set forth in claim 1, in which the means for discharging said capacitor by an operating signal transfers an operating signal to a high potential side and consists of means adapted to produce a stress wave signal, said operating signal being defined by said stress wave signal.

5. A control device as set forth in claim 1, wherein there is further provided a device having a discharge gap disposed in the circuit of the operating capacitor, and a capacitor having a small capacity connected between one of the main electrodes and a starting electrode of said discharge gap.

6. A control device as set forth in claim 1, including a plurality of said operating capacitors and a change-over switch means for changing over discharging circuits of said capacitors so that one of said operating capacitors is discharged after the other has been discharged, said change-over switch means being operated by a compressed gas in cooperation with the open and close operation of the circuit breaker and being further controlled by a flip-flop valve means.

7. A discharge gap of a control device for a circuit breaker as set forth in claim 6, in which operation of said change-over switch is further effected by changing a distance between main electrodes of said discharge gap.

* * * * *